United States Patent (10) Patent No.: US 8,120,263 B2
Lin et al. (45) Date of Patent: Feb. 21, 2012

(54) PORTABLE LIGHTING DEVICE AND METHOD THEREOF

(75) Inventors: Yung Lin Lin, Palo Alto, CA (US); ShengTai Lee, Taipei (TW)

(73) Assignee: O2Micro, Inc, Santa Clara, CA (US)

( * ) Notice: Subject to any disclaimer, the term of this patent is extended or adjusted under 35 U.S.C. 154(b) by 313 days.

(21) Appl. No.: 12/493,420

(22) Filed: Jun. 29, 2009

(65) Prior Publication Data

US 2010/0237784 A1  Sep. 23, 2010

(30) Foreign Application Priority Data

Mar. 20, 2009 (CN) .......................... 2009 1 0129517
Mar. 20, 2009 (CN) ....................... 2009 2 0006674 U (51) Int. Cl.
H05B 37/02 (2006.01)
H05B 39/02 (2006.01)
H05B 39/04 (2006.01)
H05B 41/36 (2006.01)

(52) U.S. Cl. ................ 315/209 R; 315/200 A; 315/308; 362/157

(58) Field of Classification Search .............. 315/200 A, 315/209 R, 224, 293, 298, 314, 291, 307–308; 362/183–184, 205–208, 299, 308, 311, 319; 361/18–20, 78, 83

See application file for complete search history.

(56) References Cited

U.S. PATENT DOCUMENTS

| 7,375,472 B2 | 5/2008 | Wong et al. | |
| 2004/0233144 A1 | 11/2004 | Rader et al. | |
| 2007/0217188 A1* | 9/2007 | Klipstein et al. | 362/157 |
| 2008/0088254 A1* | 4/2008 | Yang | 315/247 |
| 2010/0072915 A1* | 3/2010 | Chu et al. | 315/291 |

FOREIGN PATENT DOCUMENTS

| CN | 100401616 C | 7/2008 |
| JP | 2006158186 A | 6/2006 |

\* cited by examiner

*Primary Examiner* — Shawki S Ismail
*Assistant Examiner* — Jany Tran (57) ABSTRACT

A portable lighting device includes a power source, a controller, and a load. The controller comprises a power input terminal which is electrically connected to the power source via a switch. The load is electrically connected to a power output terminal of the controller and is capable of providing a feedback signal. The controller regulates the power being provided to the load according to the feedback signal and a conduction status of the switch.

18 Claims, 10 Drawing Sheets

PORTABLE LIGHTING DEVICE AND METHOD THEREOF

RELATED APPLICATION

This application claims foreign priority to Chinese Patent Application No. 200910129517.X, titled Portable Lighting Device and Method Thereof, inventors Sheng-Tai Lee and Yung-Lin Lin, filed on Mar. 20, 2009 with the Chinese Patent and Trademark Office. This application also claims foreign priority to Chinese Utility Model Patent Application No. 200920006674.7, titled Portable Lighting Device and Method Thereof, inventors Sheng-Tai Lee and Yung-Lin Lin, filed on Mar. 20, 2009 with the Chinese Patent and Trademark Office.

TECHNICAL FIELD

Embodiments in accordance with the present invention relate to lighting devices and in particular to portable lighting devices with power management control.

BACKGROUND

Conventionally, portable lighting devices such as flash lights use incandescent lamps as light sources. In recent years, light emitting diodes (LEDs) has become popular in LCD backlight, home appliance, and street light applications. The adoption of the LEDs for flash lights has been increased due to LEDs' better light efficiency and longer life over incandescent lamps.

Flash lights are usually powered by batteries. The surge power applied to the lamps when the flash light is initially turned on may degrade the life time of the lamps. One of the common solutions is to add a current limiting resistor between the lamp and the battery. However, the power dissipation of the resistor may shorten the battery life.

Figure 1A:
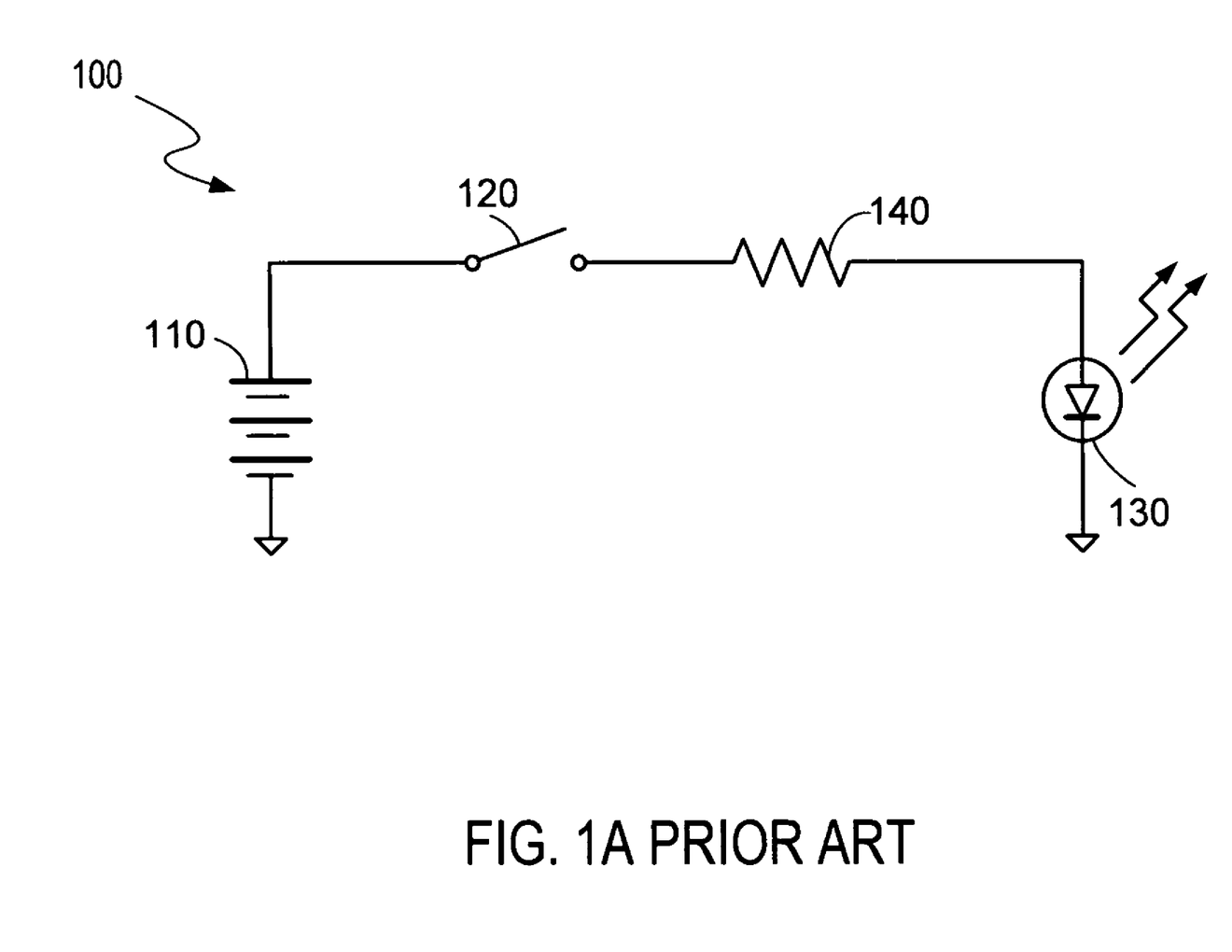
FIG. 1A shows a conventional driving circuit used in a flash light.

The LED generally has a forward voltage between 3.2V to 4.0V when conducted. An alkaline battery cell for home appliances normally provides a voltage of 1.5V. Therefore, it may require at least three alkaline battery cells to power an LED. FIG. 1A shows a circuit 100 used in a conventional flash light. The circuit 100 uses a battery pack 110 including three series-connected cells as a power source. Each cell provides a voltage of 1.5V. The battery pack 110 powers an LED 130 via a switch 120. The LED 130 has a 3.2V forward voltage and a 100 mA current when conducted. The circuit 100 includes a current limiting resistor 140 (e.g., 13 Ohm) coupled between the LED 130 and the battery pack 110.

In operation, the power dissipation of the current limiting resistor 140 is approximately 0.13 Watt and the power dissipation of the LED 130 is approximately 0.32 Watt. As such, the power consumed by the LED 130 is approximately 71% of the total power provided by the battery pack 110. In other words, part of the battery power is wasted by the current limiting resistor 140. Thus, the battery pack 110 may need to provide sufficient power to maintain brightness of the LED 130, which may reduce the battery life.

Due to manufacturing process or other factors, the LED 130 may have a forward voltage of 4.0V when conducted. Thus, the current flowing through the LED 130 may be limited to approximately 38.5 mA, which is approximately 38.5% of the rated current (100 mA). Accordingly, the brightness of the LED 130 may be reduced to 38.5% of the expected brightness. The resistance of the resistor 140 can be changed from 13 Ohm to 5 Ohm to yield a current of 100 mA flowing through the LED 130 such that the LED 130 can have the expected brightness (the brightness when the LED current is 100 mA). However, if the resistance of the resistor 140 is 5 Ohm, the circuit 100 may overdrive the LEDs which have lower forward voltages. For example, for an LED having a forward voltage of 3.2V, the current flowing through the LED is approximately 260 mA which can be greater than a rated current of the LED. Consequently, the LED life time may be shortened.

Figure 1B:
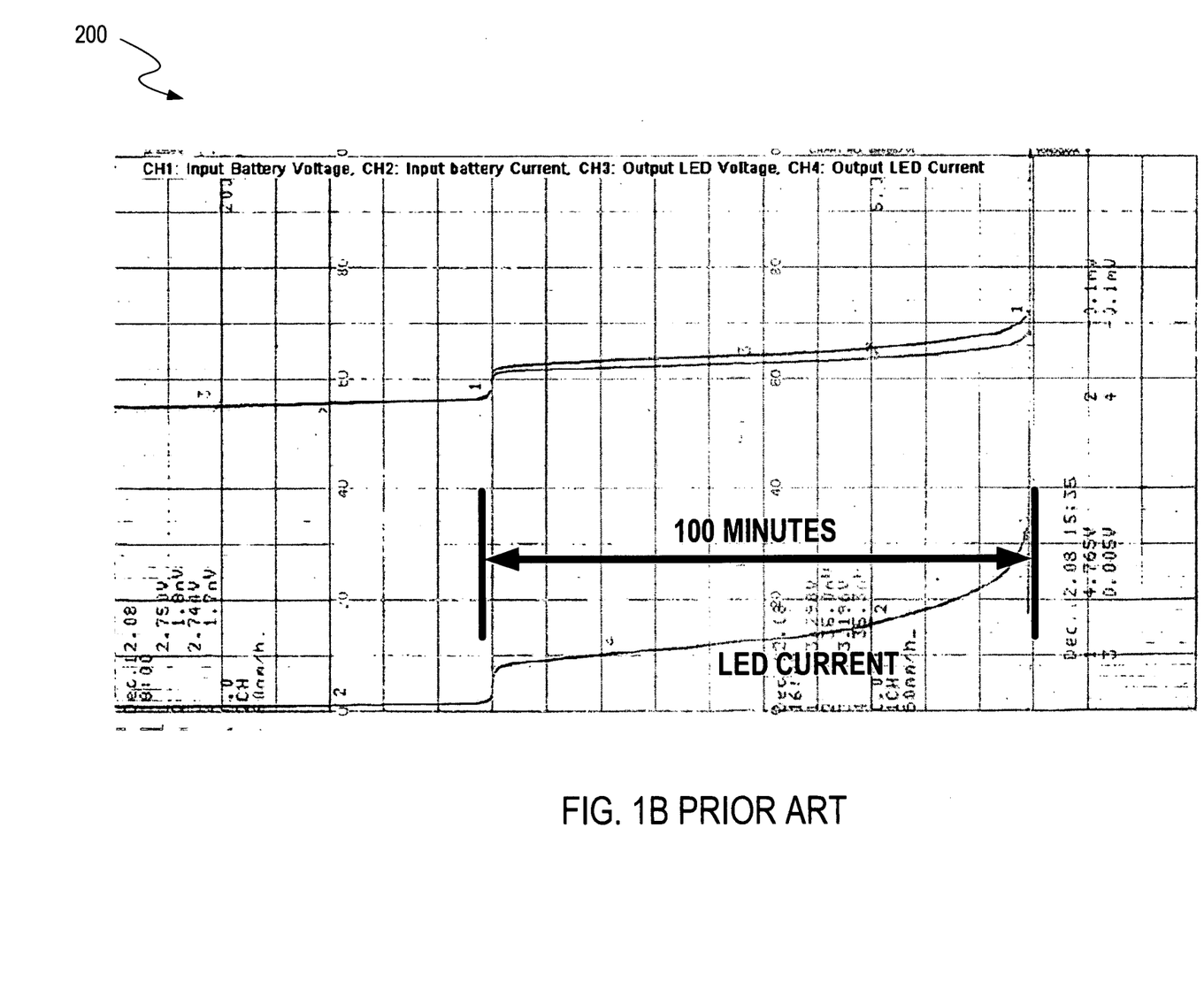
FIG. 1B shows a graph illustrating performance of the conventional driving circuit in FIG. 1A.

FIG. 1B shows a graph 200 illustrating performance of the conventional circuit shown in FIG. 1A. The conventional circuit utilizes two 1.5V alkaline battery cells together with a current limiting resistor to drive an LED having a 100 mA rated current. As shown in the graph 200, the run time of the battery cells in this conventional circuit is only approximately 100 minutes.

Furthermore, the conventional circuit 100 is limited in practical applications when a user uses different LEDs with different power ratings. For example, the user may replace the LED having a 100 mA rated current with an LED having a 1A rated current with the expectation of obtaining greater power. Unfortunately, since the current limiting resistor has fixed resistance, the current flowing through the LED will not be changed. Moreover, the number of battery cells is usually determined by the shape of the flash light and can not be changed after production. Generally speaking, such conventional circuit using a current limiting resistor has lower power efficiency, lacks flexibility, and may not be practical for different applications.

SUMMARY

The present invention provides circuits for powering a load such as a light source. If the voltage of a power source is relatively low (e.g., the voltage of the power source is 1V), a controller can boost the voltage to a level that is sufficient to drive a light source (e.g., an LED). If the voltage of the power source is relatively high (e.g., the voltage of the power source is 6V), the controller can reduce the voltage to a desirable level to drive the light source. The circuits can include an integrated circuit (IC), an inductor and/or other devices to constitute a boost converter, or a buck converter, or a buck-boost converter for powering the light source. The boost converter, buck converter, or buck-boost converter with relatively high power efficiency can extend life time of the power source and reduce the number of battery cells if the power source is a battery. Accordingly, the weight of a lighting device (e.g., a flash light) can be reduced. Furthermore, the circuits according to the present invention can be suitable for light sources with different power ratings, and the life time of the light source can be extended.

According to one embodiment of the invention, a portable lighting device includes a power source, a controller coupled to the power source through a switch, and a load coupled to the controller. The load can generate a feedback signal. The controller can adjust power of the load based on the feedback signal and a conduction status of the switch.

According to another embodiment of the invention, a method of powering a load includes the following steps: supplying input power to a controller through a switch; powering a load by the controller; generating a feedback signal by a sensor in the load; sending the feedback signal to the controller; and adjusting power of the load based on the feedback signal and a conduction status of the switch.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
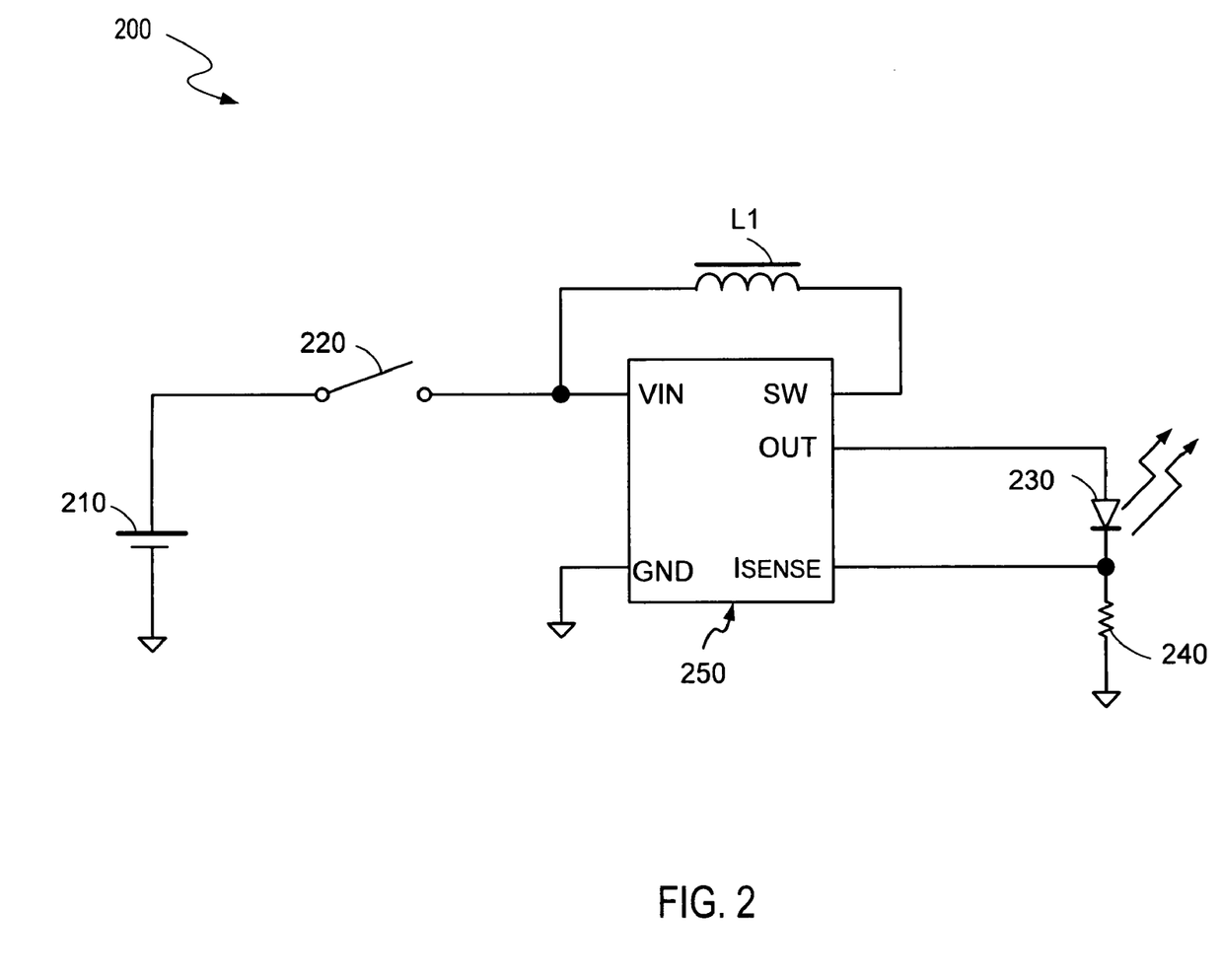
FIG. 2 shows a driving circuit in a portable lighting device, in accordance with one embodiment of the present invention.

FIG. 2 shows a driving circuit 200 in a portable lighting device, in accordance with one embodiment of the present invention. In one embodiment, the portable lighting device can be a flash light. The circuit 200 includes a power source 210 operable for providing a voltage Vbatt, a switch 220, a load such as a light source 230, a sensor 240, a controller 250, and an inductor L1. However, the invention is not so limited; the circuit 200 can include any number of loads or light sources. In one embodiment, the power source 210 can be one or more alkaline battery cells. In one embodiment, the light source 230 can be an LED. In one embodiment, the controller 250 can be an integrated circuit (IC). In one embodiment, the controller 250 can include a power input terminal VIN for receiving input power from the power source 210, a power output terminal OUT for providing output power, a terminal ISENSE for receiving a feedback signal, a terminal GND coupled to ground, and an output switching terminal SW coupled to the power input terminal Vin through the inductor L1.

In one embodiment, the power input terminal VIN of the controller 250 is coupled to the power source 210 through the switch 220. The power output terminal OUT is coupled to the light source 230. The sensor 240 is coupled to the light source 230 in series for providing the feedback signal indicating an electrical characteristic of the light source 230. In one embodiment, the electrical characteristic of the light source 230 includes a level of the current flowing through the light source 230. The feedback signal is sent to the terminal ISENSE of the controller 250.

In one embodiment, the inductor L1 functions as an energy storage element of a boost converter. If the switch 220 is turned on, the controller 250 is coupled to the power source 210 via the power input terminal VIN to receive the power supplied by the power source 210. The light source 230 can be powered via the power output terminal OUT of the controller 250. If the switch 220 is turned off, the power from the power source 210 can be cut off. In one embodiment, the controller can adjust the power supplied to the light source 230 based on the feedback signal received at the terminal ISENSE and a conduction status, e.g., the on/off status, of the switch 220.

Figure 3:
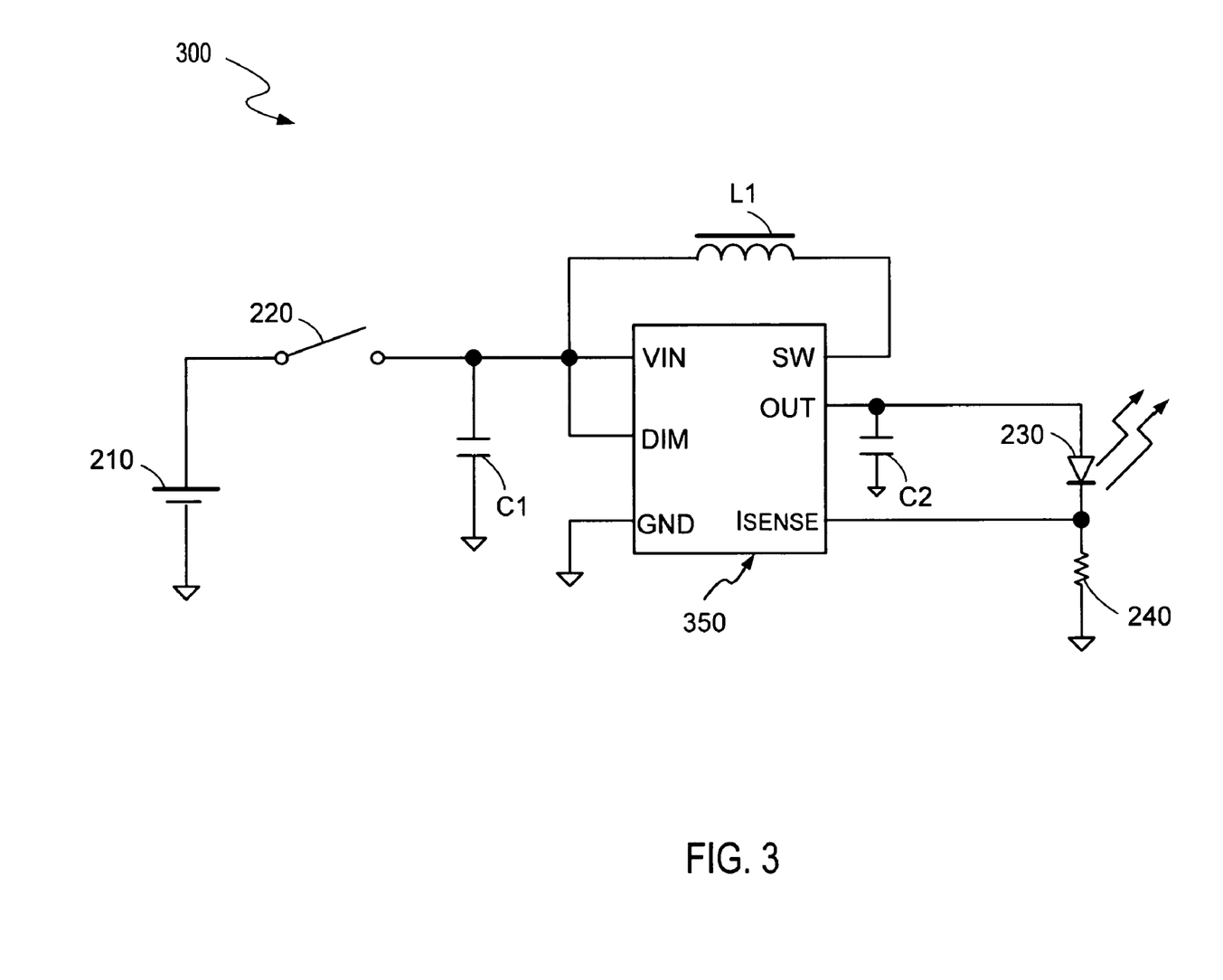
FIG. 3 shows a driving circuit in a portable lighting device, in accordance with one embodiment of the present invention.

FIG. 3 shows a driving circuit 300 in a portable lighting device, in accordance with one embodiment of the present invention. The circuit 200 includes a power source 210, a switch 220, a light source 230, a sensor 240, a controller 350, and an inductor L1. Elements labeled the same as in FIG. 2 have similar functions and will not be detailed described herein.

In one embodiment, the controller 350 can be an integrated circuit. In one embodiment, the circuit 300 further includes a capacitor C1 coupled between the power source 210 and the power input terminal VIN of the controller 350. In one embodiment, the circuit 300 further includes a capacitor C2 coupled between the light source 230 and the power output terminal OUT of the controller 350. In one embodiment, the controller 350 includes a terminal DIM coupled to the switch 220 for monitoring the on/off status of the switch 220.

In one embodiment, the controller 350 can adjust the power of the light source 230 based on the input at the terminal DIM. Accordingly, the brightness of the light source 230 can be adjusted by the controller 350. In one embodiment, the controller 350 adjusts the power of the light source 230 if the switch 220 is turned on.

Figure 4A:
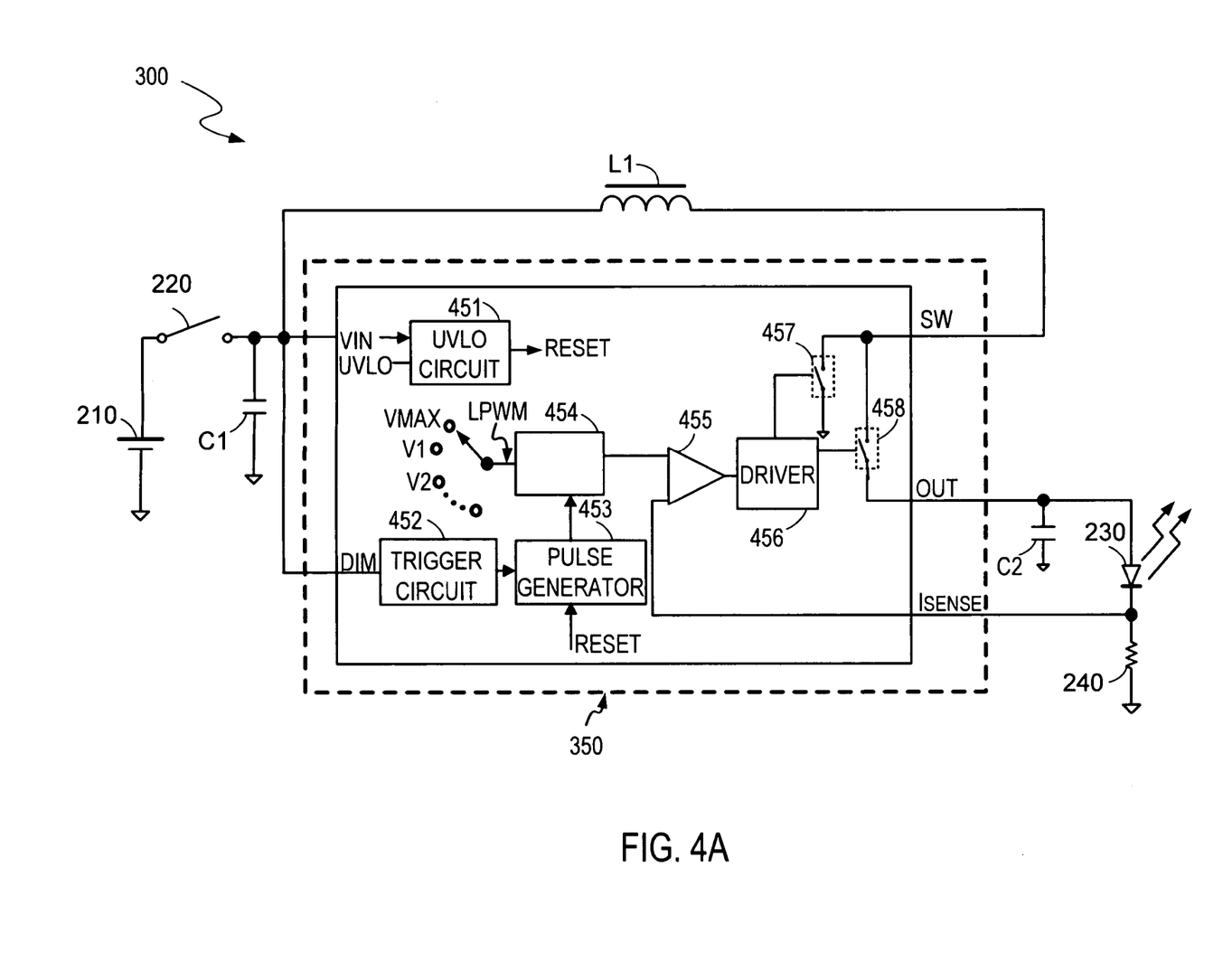
FIG. 4A shows a structure of the controller 350 in FIG. 3, in accordance with one embodiment of the present invention.
Figure 4B:
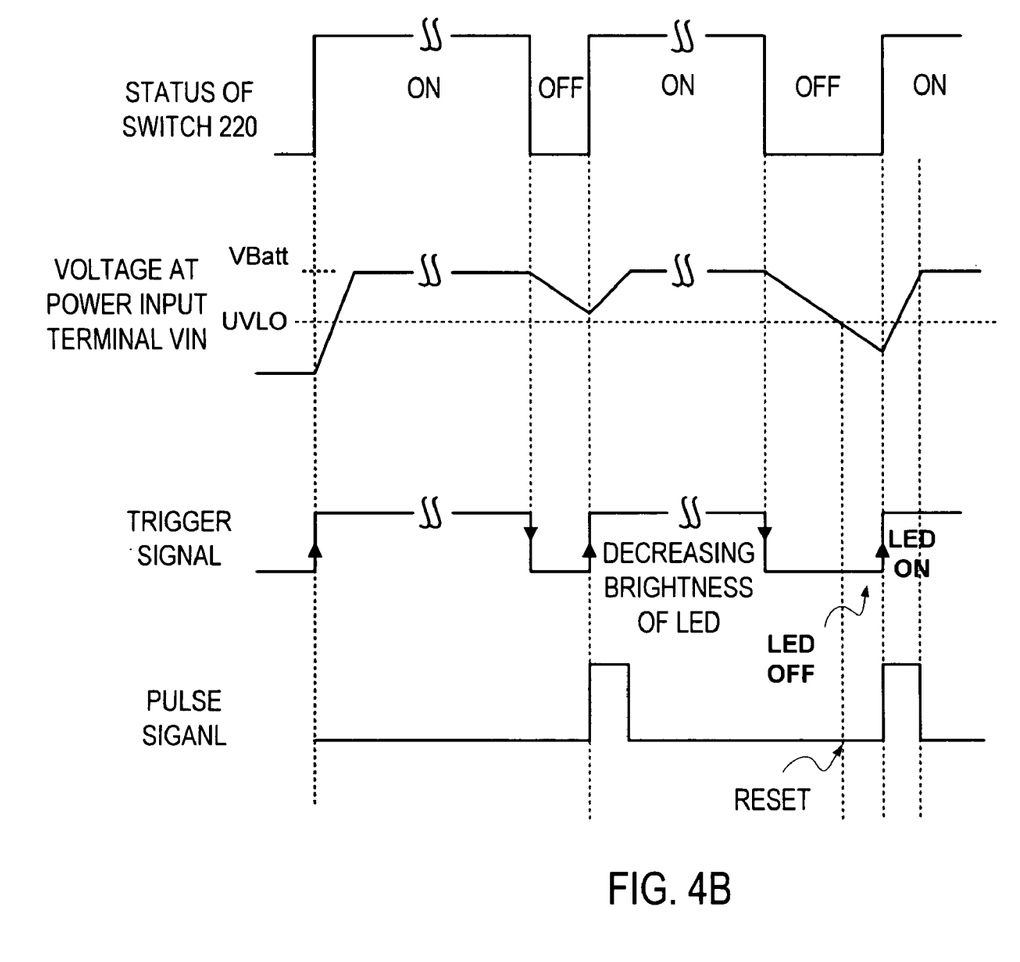
FIG. 4B shows a sequence diagram of the circuit 300 in FIG. 4A, in accordance with one embodiment of the present invention.

FIG. 4A shows a structure of the controller 350 in FIG. 3, in accordance with one embodiment of the present invention. Elements labeled the same as in FIG. 3 have similar functions. In one embodiment, the controller 350 can include an under voltage lockout (UVLO) circuit 451, a trigger circuit 452, a pulse generator 453, a reference selection circuit 454, a dimming unit 455, a driver 456, a switch 457, and a switch 458. FIG. 4B shows a sequence diagram of the circuit 300 in FIG. 4A. FIG. 4A is described in combination with FIG. 4B.

If the switch 220 is turned on, the power from the power source 210 is supplied to the power input terminal VIN of the controller 350. The light source 230 can be powered by a rated current. In one embodiment, the reference selection circuit 454 can generate a reference signal LPWM. In one embodiment, the reference signal LPWM can have different levels, e.g., Vmax, V1, V2, etc., where Vmax>V1>V2. Each voltage level of the reference signal LPWM can correspond to a brightness level of the light source 230. The dimming unit 455 can adjust the brightness of the light source 230 based on the voltage level of the reference signal LPWM. Initially, the reference selection circuit 454 can generate the reference signal LPWM having the level of Vmax, in one embodiment. Accordingly, the dimming unit 455 can initially adjust the brightness of the light source 230 to a maximum brightness (e.g., 100% brightness).

If the switch 220 is turned off, the power from the power source 210 to the controller 350 is cut off. In response, the trigger circuit 452 generates a trigger signal having a first falling edge. The controller 350 can be powered by the energy stored in the capacitor C1. Therefore, during a certain time period after the switch 220 is turned off, the voltage at the power input terminal VIN will not decrease to a predetermined voltage, e.g., an under voltage lockout (UVLO) threshold. If the switch 220 is turned on during such time period (e.g., before the voltage at the terminal VIN drops below the UVLO threshold), the trigger circuit 452 generates a trigger signal having a first rising edge. Accordingly, the pulse generator 453 can generate a first pulse in response to the first rising edge of the trigger signal. The first pulse is sent to the reference selection circuit 454. The reference selection circuit 454 can generate the reference signal LPWM having a level of V1 according to the first pulse, in one embodiment. In one embodiment, the voltage V1 can be lower than the voltage Vmax. For example, by setting the reference signal LPWM at V1, the light source 230 can have a 75% brightness. The level of V1 can be predetermined according to different application requirements.

In one embodiment, if the switch 220 is turned off again, the trigger circuit 452 generates a trigger signal having a second falling edge. During a certain time period before the voltage at the power input terminal VIN decreases to the UVLO threshold, if the switch 220 is turned on again, the trigger circuit 452 generates a trigger signal having a second rising edge. Accordingly, the pulse generator 453 can generate a second pulse in response to the second rising edge of the trigger signal. The second pulse is sent to the reference selection circuit 454. The reference selection circuit 454 can generate the reference signal LPWM having a level of V2 according to the second pulse, in one embodiment. In one embodiment, the voltage V2 can be lower than the voltage V1. For example, by setting the reference signal LPWM at V2, the light source 230 can have a 50% brightness. In another embodiment, the voltage V2 can be higher than the voltage V1 and lower than the voltage Vmax. For example, by setting the reference signal LPWM at V2, the light source 230 can have a 80% brightness.

The operation of adjusting the brightness of the light source 230 described above can be repeated if the switch 220 is turned on and turned off repeatedly. The voltage levels of the reference signal LPWM, e.g., Vmax, V1, V2, etc., can be predetermined and can be preconfigured. In one embodiment, the voltage of the reference signal LPWM can be sequentially decreased from 100% to 75%, to 50%, and then to 25% in response to four consecutive pulses which are generated by the pulse generator 453. In another embodiment, the voltage of the reference signal LPWM can be sequentially increased from 25% to 50%, to 75%, and then to 100% in response to four consecutive pulses from the pulse generator 453. In one embodiment, the voltage of the reference signal LPWM can be adjusted such that the brightness of the light source 230 can be adjusted linearly, e.g., from 25% to 50%, to 75%, and then to 100%. In another embodiment, the voltage of the reference signal LPWM can be adjusted such that the brightness of the light source 230 can be adjusted non-linearly, e.g., from 20% to 30%, to 80%, and then to 100%. In yet another embodiment, the voltage of the reference signal LPWM can be adjusted such that the brightness of the light source 230 can be adjusted from 100% to 50%, and then to 100% to represent an SOS signal.

In one embodiment, the dimming unit 455 can generate a dimming signal to adjust the current flowing through the light source 230 by adjusting the output power at the power output terminal OUT. The dimming signal can be generated according to the voltage of the reference signal LPWM and the feedback signal from the sensor 240. As a result, the brightness of the light source 230 can be adjusted accordingly. In one embodiment, the sensor 240 can be a resistor. In another embodiment, the sensor 240 can be a combination of a resistor and a capacitor (not shown in FIG. 4A).

In one embodiment, the output of the dimming unit 455 can be amplified by the driver 456. In one embodiment, the output of the driver 456 is coupled to the switch 457 to control the switch 457 such that the power from the power source 210 and the power stored in the capacitor C1 can be selectively applied to the power output terminal OUT. In one embodiment, the dimming unit 455 can be a pulse width modulation (PWM) circuit. In another embodiment, the dimming unit 455 can be a pulse frequency modulation (PFM) circuit.

In one embodiment, the switch 457, the switch 458, the capacitor C2, and the inductor L1 constitute a boost converter which can boost the voltage at the power output terminal OUT to a voltage that is high enough to drive the light source 230. In one embodiment, the output switching terminal SW is coupled to the power input terminal Vin through the inductor L1, and is coupled to ground through the switch 457. The output switching terminal SW is also coupled to the power output terminal OUT through the switch 458. The power output terminal OUT is coupled to the capacitor C2. As such, even if the power source 210 provides a relatively low voltage, e.g., 1V, the boost converter can provide an increased voltage at the power output terminal OUT to drive the power source 230. Furthermore, the power of the light source 230 can be adjusted by the controller 350. Therefore, the run time as well as the life time of the power source 210 can be extended.

In one embodiment, the switch 457 and the switch 458 can be metal oxide semiconductor field effect transistors (MOSFET). In one embodiment, the switch 457 and the switch 458 can operate in a complimentary mode. In other words, the switch 457 and the switch 458 can be alternately turned on and off. In one embodiment, the switch 457 can be an N-channel MOSFET. In one embodiment, the switch 458 can be a P-channel MOSFET. In another embodiment, the switch 458 can be a diode.

If the switch 220 is turned off for a time period long enough that the voltage at the power input terminal VIN drops below a predetermined voltage, e.g., the UVLO threshold, the UVLO circuit 451 can generate a UVLO signal such as a reset signal. The reset signal can reset the pulse generator 453 and can turn off the light source 230. The light source 230 remains off until the switch 220 is turned on again.

Figure 5:
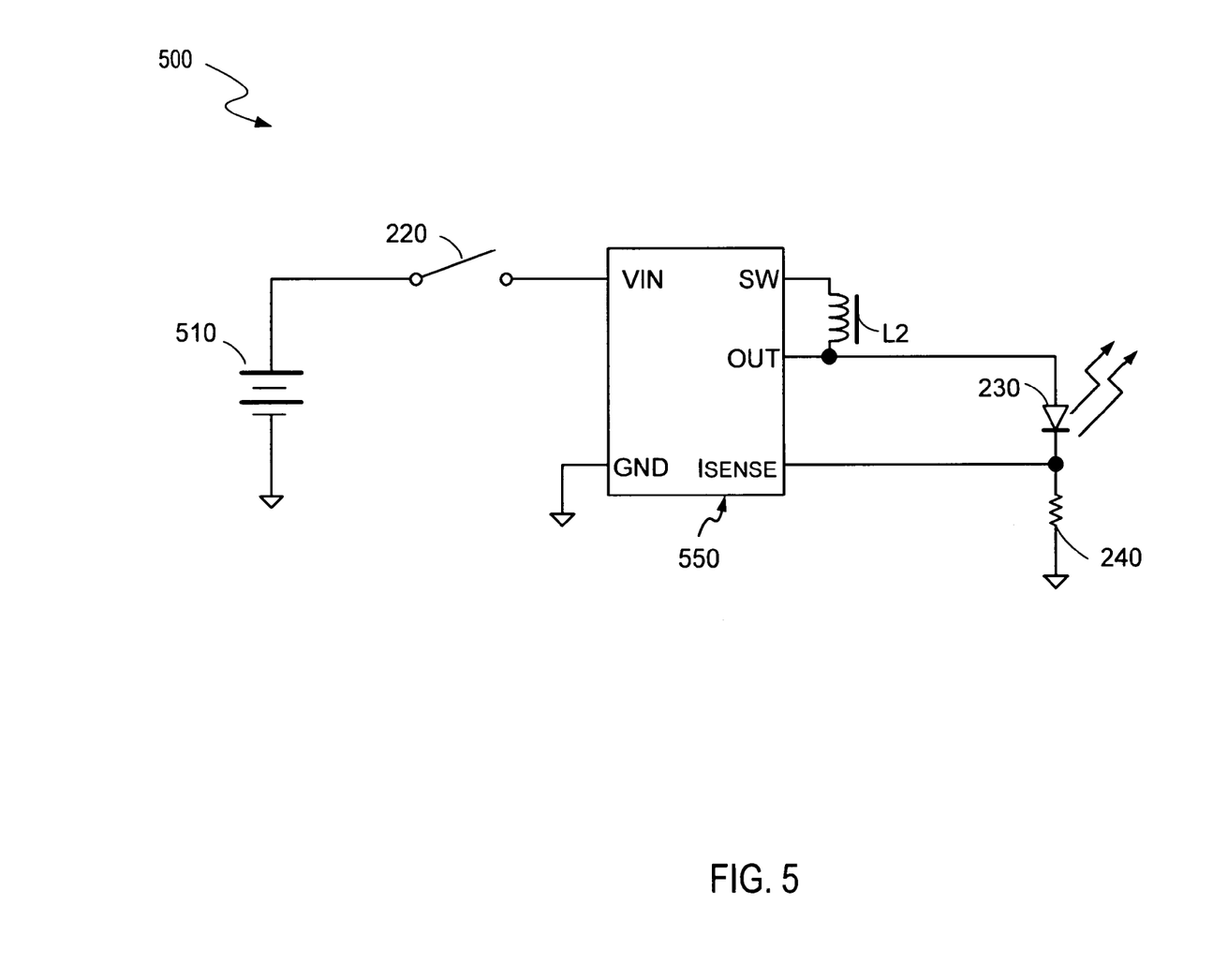
FIG. 5 shows a driving circuit in a portable lighting device, in accordance with one embodiment of the present invention.

FIG. 5 shows a driving circuit 500 in a portable lighting device, in accordance with one embodiment of the present invention. In one embodiment, the circuit 500 can include a power source 510, a switch 220, a light source 230, a sensor 240, a controller 550, and an inductor L2. In one embodiment, the power source 510 can include one or more alkaline battery cells. In one embodiment, the light source 230 can be an LED. In one embodiment, the controller 550 can be an integrated circuit. Elements labeled the same as in FIG. 2 have similar functions and will not be detailed described herein.

In one embodiment, the inductor L2 functions as an energy storage element of a buck convertor. When the switch 220 is turned on, the power input terminal VIN of the controller 550 is coupled to the power source 510. The power from the power output terminal OUT of the controller 550 is supplied to the light source 230. If the switch 220 is turned off, the power from the power source 510 to the controller 550 is cut off. In one embodiment, the controller 550 can adjust the power supplied to the light source 230 based on the feedback signal received at the terminal ISENSE and the on/off status of the switch 220.

Figure 6:
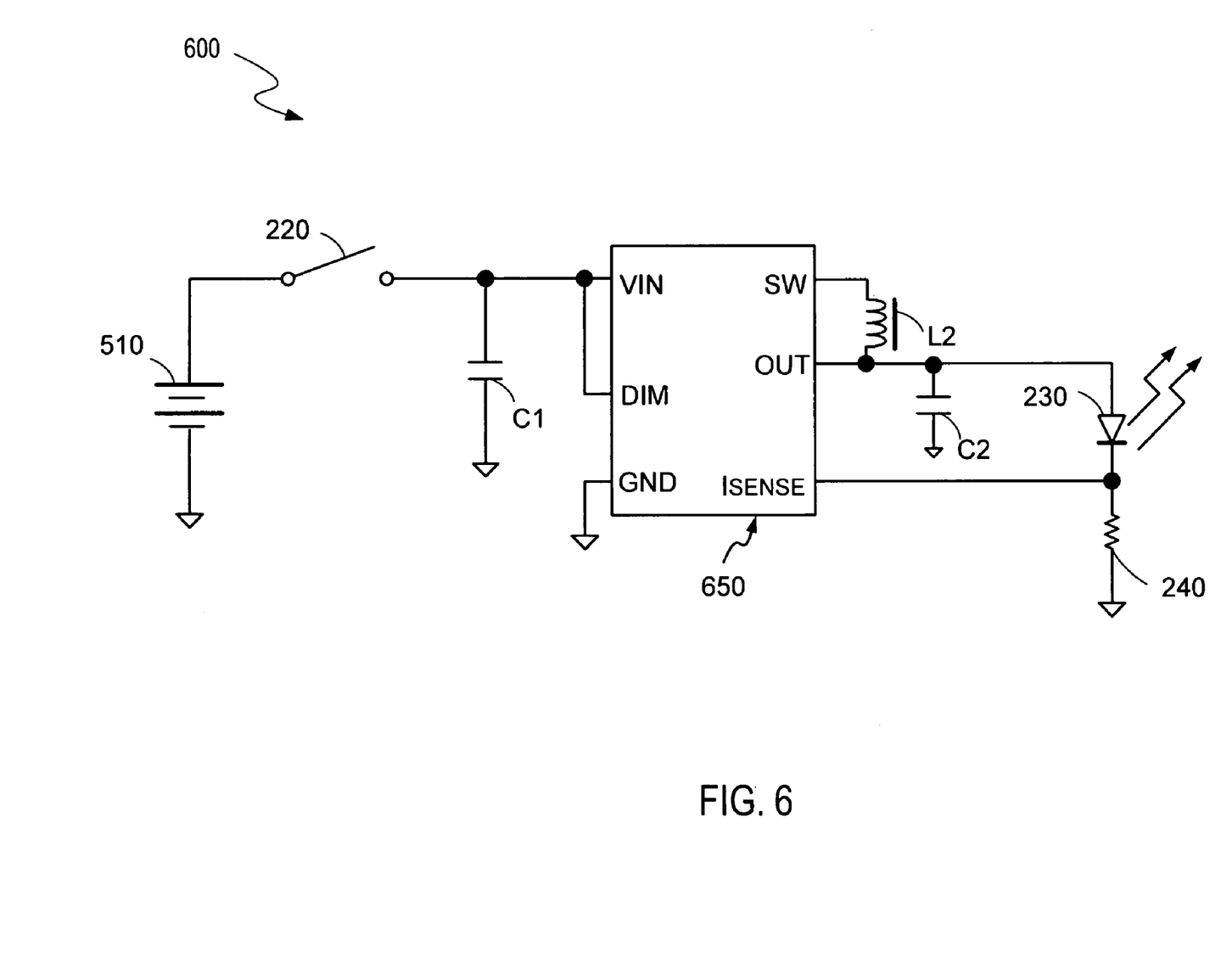
FIG. 6 shows a driving circuit in a portable lighting device, in accordance with one embodiment of the present invention.

FIG. 6 shows a driving circuit 600 in a portable lighting device, in accordance with one embodiment of the present invention. In one embodiment, the circuit 600 can include a power source 510, a switch 220, a light source 230, a sensor 240, a controller 650, an inductor L2, a capacitor C1, and a capacitor C2. Elements labeled the same as in FIG. 5 have similar functions and will not be detailed described herein.

Figure 7:
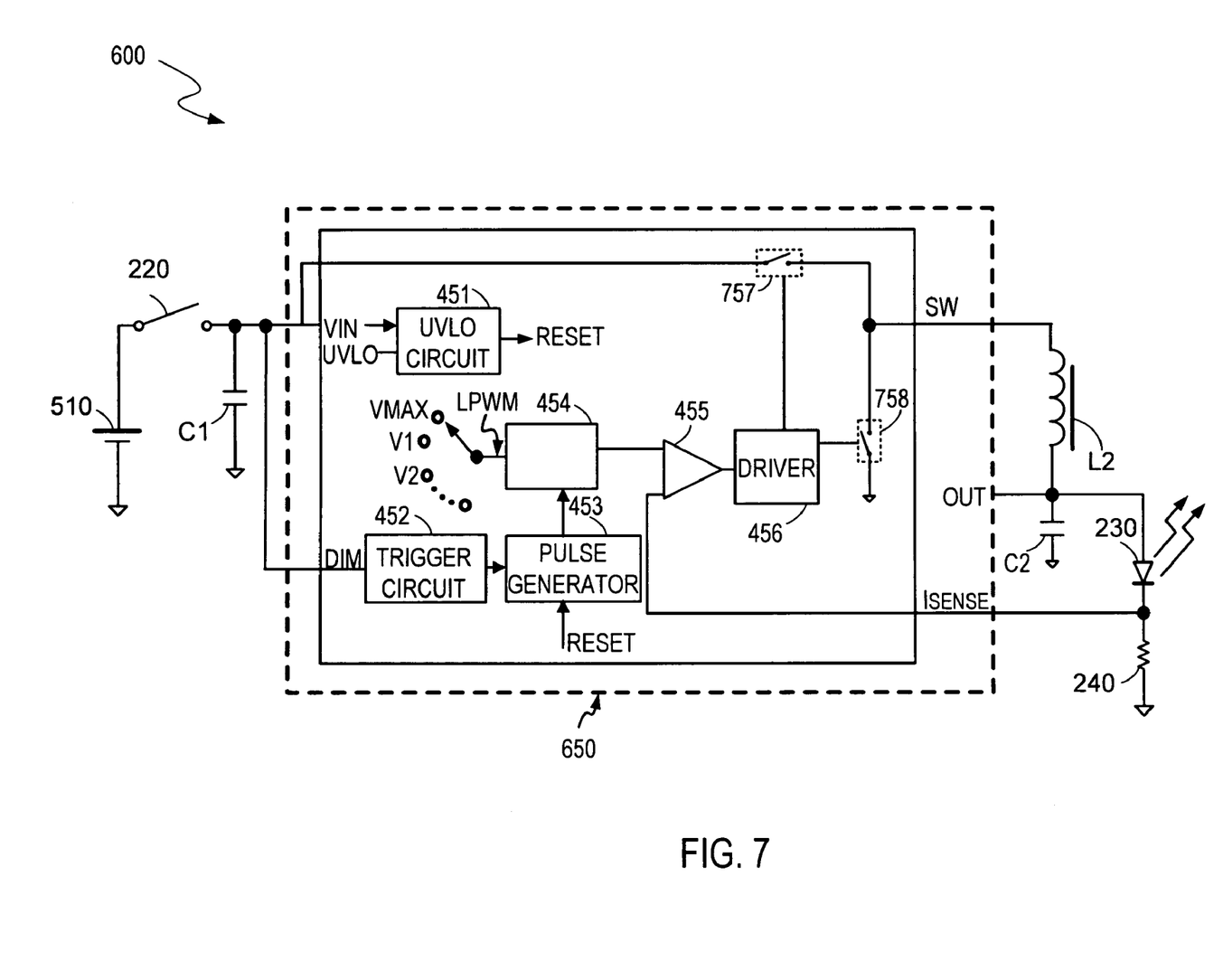
FIG. 7 shows a structure of the controller 650 in FIG. 6, in accordance with one embodiment of the present invention.

FIG. 7 shows a structure of the controller 650 in FIG. 6, in accordance with one embodiment of the present invention. In one embodiment, the controller 350 can include a UVLO circuit 451, a trigger circuit 452, a pulse generator 453, a reference selection circuit 454, a dimming unit 455, a driver 456, a switch 757, and a switch 758. Elements labeled the same as in FIG. 4A have similar functions and will not be detailed described herein. The sequence diagram of the circuit 600 is similar to the sequence diagram of the circuit 300 (shown in FIG. 4B) and will not be detailed described herein.

In one embodiment, the switch 757, the switch 758, the capacitor C2, and the inductor L2 constitute a buck converter which can reduce the voltage at the power output terminal OUT of the controller 650 to a lower voltage to drive the light source 230. In one embodiment, the output switching terminal SW is coupled to the power input terminal VIN through the switch 757. The output switching terminal SW is coupled to ground through the switch 758. The output switching terminal SW is also coupled to ground through the inductor L2 and the capacitor C2. The power output terminal OUT of the controller 650 is coupled to a node between the inductor L2 and the capacitor C2. Therefore, even if the voltage supplied by the power source 510 is higher than a proper voltage (e.g., 6V) to drive the light source 230, the controller 650 can drive the light source 230 with a reduced voltage provided by the buck converter. Furthermore, the power of the light source 230 can be adjusted by the controller 650. Therefore, the run time as well as the life time of the power source 510 can be extended.

In one embodiment, the switch 757 and the switch 758 can be MOSFETs. In one embodiment, the switch 757 and the switch 758 can operate in a complimentary mode. In other words, the switch 757 and the switch 758 can be alternately turned on and off. In one embodiment, the switch 757 can be an N-channel MOSFET. In one embodiment, the switch 758 can be a P-channel MOSFET. In another embodiment, the switch 758 can be a diode.

Figure 8:
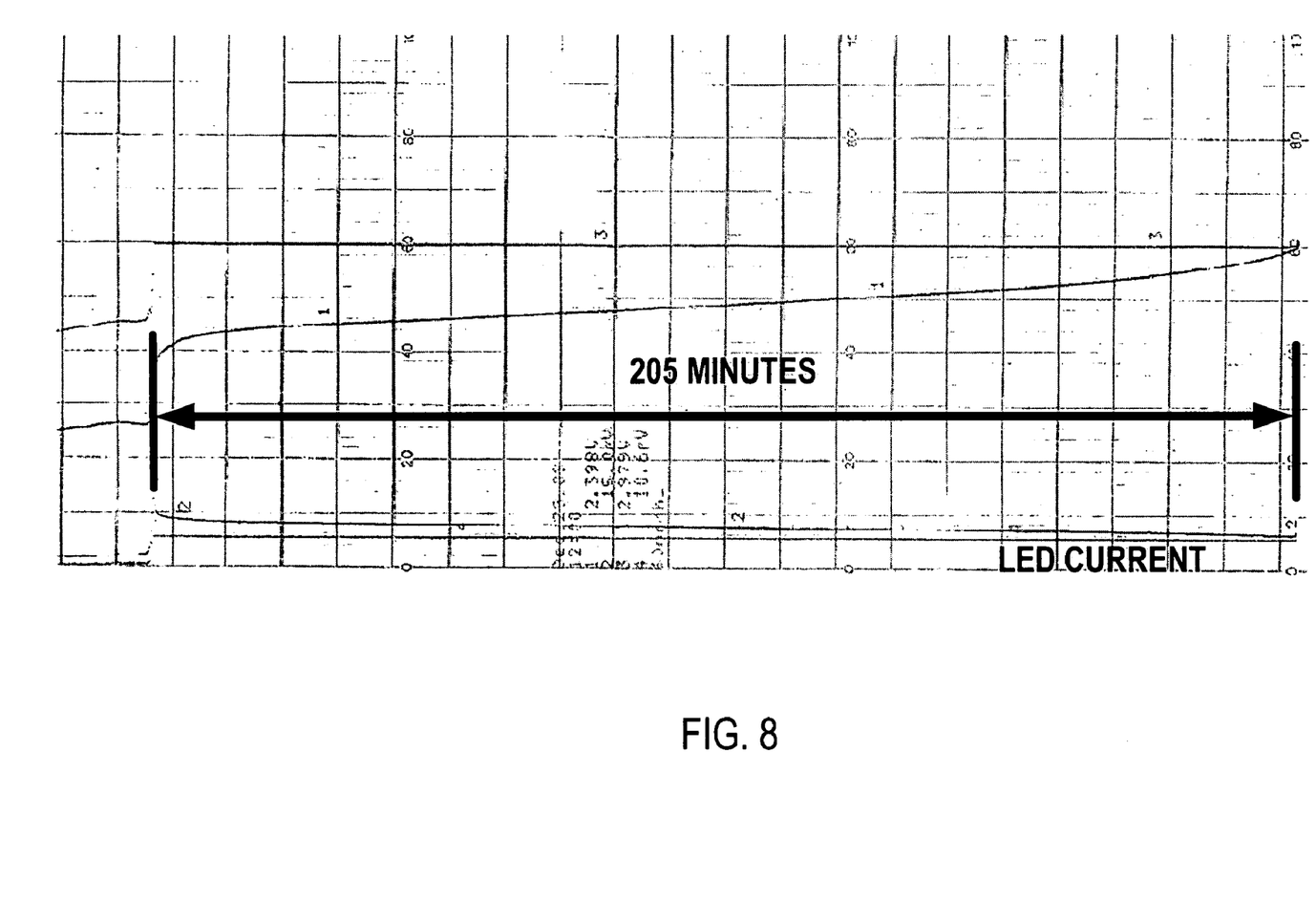
FIG. 8 shows a graph illustrating performance of the driving circuit in FIG. 4A according to one embodiment of the present invention.

FIG. 8 shows a graph illustrating performance of the circuit 300 in FIG. 4A according to one embodiment of the present invention. By way of example, the circuit utilizes two 1.5V alkaline battery cells to drive an LED having a 100 mA rated current. The waveform in FIG. 8 indicates the current flowing through the LED. By comparing FIG. 8 and FIG. 1B, it shows that if the currents flowing through the LEDs are of the same level (the brightness of the LEDs are the same), the battery run time of a conventional circuit is only approximately 100 minutes (shown in FIG. 1B), while the battery run time of the circuit according to the present invention is approximately 205 minutes. As a result, the run time as well as the life time of the battery can be extended and the number of battery cells can be reduced.

The term "battery" in the present invention is not limited to batteries including dry cells or alkaline battery cells. The invention can use different types of batteries such as Lithium ion battery or other types of batteries. In the examples described above, an LED is used as a light source. However, any number of LEDs can be included. Furthermore, the light source is not limited to the LEDs. In the examples described above, the circuits are used in flash lights. However, the circuits can also be used in different types of lighting devices or systems with different sizes and purposes, e.g., head lamps or bicycle lamps.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description

What is claimed is:

1. A portable lighting device comprising:
    a power source;
    a controller having a power input terminal, wherein said power input terminal is coupled to said power source through a switch; and
    a load comprising a light emitting diode (LED) coupled to a power output terminal of said controller and operable for providing a feedback signal, wherein said controller is operable for adjusting power of said LED based on said feedback signal and a conduction status of said switch,
    wherein said controller comprise:
        an under voltage lockout (UVLO) circuit coupled to said power input terminal and operable for generating a UVLO signal by comparing a voltage at said power input terminal with a predetermined voltage;
        a trigger circuit coupled to said power input terminal and operable for generating a trigger signal;
        a pulse generator operable for receiving said UVLO signal and said trigger signal and for generating a pulse signal;
        a reference selection circuit operable for receiving said pulse signal and for selecting a reference signal among a plurality of reference signals according to said pulse signal; and
        a dimming unit operable for generating a dimming signal based on said selected reference signal and said feedback signal to adjust power of said LED.

2. The portable lighting device of claim 1, wherein said controller is operable for adjusting power of said LED if said switch is turned on.

3. The portable lighting device of claim 1, wherein said load further comprises a sensor operable for sensing an electrical characteristic of said LED and for providing a feedback signal indicating said electrical characteristic of said LED.

4. The portable lighting device of claim 3, wherein said sensor comprises a resistor.

5. The portable lighting device of claim 1, wherein said power input terminal is coupled to a capacitor.

6. The portable lighting device of claim 1, wherein said power output terminal is coupled to a capacitor.

7. The portable lighting device of claim 1, wherein said controller comprises an output switching terminal coupled to said power input terminal through an inductor.

8. The portable lighting device of claim 1, wherein said power source comprises a battery pack.

9. The portable lighting device of claim 8, wherein said battery pack comprises a rechargeable battery.

10. The portable lighting device of claim 8, wherein said battery pack comprises a Lithium ion battery cell.

11. The portable lighting device of claim 1, wherein said dimming unit comprises a pulse width modulation circuit.

12. The portable lighting device of claim 1, wherein said dimming unit comprises a pulse frequency modulation circuit.

13. The portable lighting device of claim 1, wherein said controller further comprises a driver operable for receiving said dimming signal to adjust power of said LED.

14. The portable lighting device of claim 1, wherein said pulse generator is reset if said switch is turned off and said voltage at said power input terminal is less than said predetermined voltage.

15. The portable lighting device of claim 1, further comprising:
a converter operable for adjusting a voltage at said power output terminal.

16. A method for powering a light emitting diode (LED), comprising:
supplying input power to a controller through a switch;
powering said LED by said controller;
generating a feedback signal by a sensor;
receiving said feedback signal by said controller; and
adjust power of said LED based on said feedback signal and a conduction status of said switch, wherein adjusting said power of said LED further comprises:
comparing a voltage supplied to said controller with a predetermined voltage to generate an under voltage lockout (UVLO) signal;
generating a trigger signal based on said conduction status of said switch;
generating a pulse signal based on said UVLO signal and said trigger signal;
selecting a reference signal among a plurality of reference signals according to said pulse signal; and
adjusting said power of said LED based on said selected reference signal and said feedback signal.

17. The method of claim 16, further comprising:
adjusting said power of said LED if said switch is turned on.

18. The method of claim 16, wherein adjusting said power of said LED further comprises:
generating a reset signal if said switch is turned off and said voltage supplied to said controller is less than said predetermined voltage.

* * * * *